United States Patent
Wang

(10) Patent No.: US 7,928,720 B2
(45) Date of Patent: Apr. 19, 2011

(54) POWER CONVERSION EFFICIENCY MEASUREMENT SYSTEM AND METHOD

(75) Inventor: Ting-Chung Wang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 0 days.

(21) Appl. No.: 12/558,582

(22) Filed: Sep. 14, 2009

(65) Prior Publication Data

US 2011/0031958 A1 Feb. 10, 2011

(30) Foreign Application Priority Data

Aug. 7, 2009 (CN) .......................... 2009 1 0305351

(51) Int. Cl.
*G01R 19/18* (2006.01)
(52) U.S. Cl. .................................................. 324/120
(58) Field of Classification Search ................... 324/120
See application file for complete search history.

(56) References Cited

U.S. PATENT DOCUMENTS 5,408,173 A * 4/1995 Knapp .......................... 323/285

* cited by examiner

*Primary Examiner* — Roberto Velez
(74) *Attorney, Agent, or Firm* — Zhigang Ma

(57) ABSTRACT

A system measures power conversion efficiency of a voltage regulator. A measurement setting module presets a maximum output current and a total measurement number, and calculates each target output current of the voltage regulator. A load adjustment module adjusts an impedance of the electronic load to equal current passing through the electronic load to the target output current of the voltage regulator. A calculation module calculates each output power and input power, and power conversion efficiencies for each sequence number of measurement.

12 Claims, 3 Drawing Sheets

POWER CONVERSION EFFICIENCY MEASUREMENT SYSTEM AND METHOD

BACKGROUND

1. Technical Field

The present disclosure relates to power conversion technologies, and particularly to a system and a method for measuring power conversion efficiency of a voltage regulator.

2. Description of Related Art

A voltage conversion device, such as a voltage regulator, may be used to convert high direct current (DC) voltage into low DC voltage provided to different chips mounted on a motherboard. To ensure that power conversion efficiency of the voltage regulator meets a standard, the power conversion efficiency needs to be measured after assembly of the voltage regulator. Often, the power conversion efficiency of the voltage regulator is obtained by manual measurement of input power, output power, and other parameters of the voltage regulator. However, if many parameters are to be measured, manual measurement becomes difficult and time consuming, making the measurement process inaccurate and inefficient.

DETAILED DESCRIPTION

Figure 1:
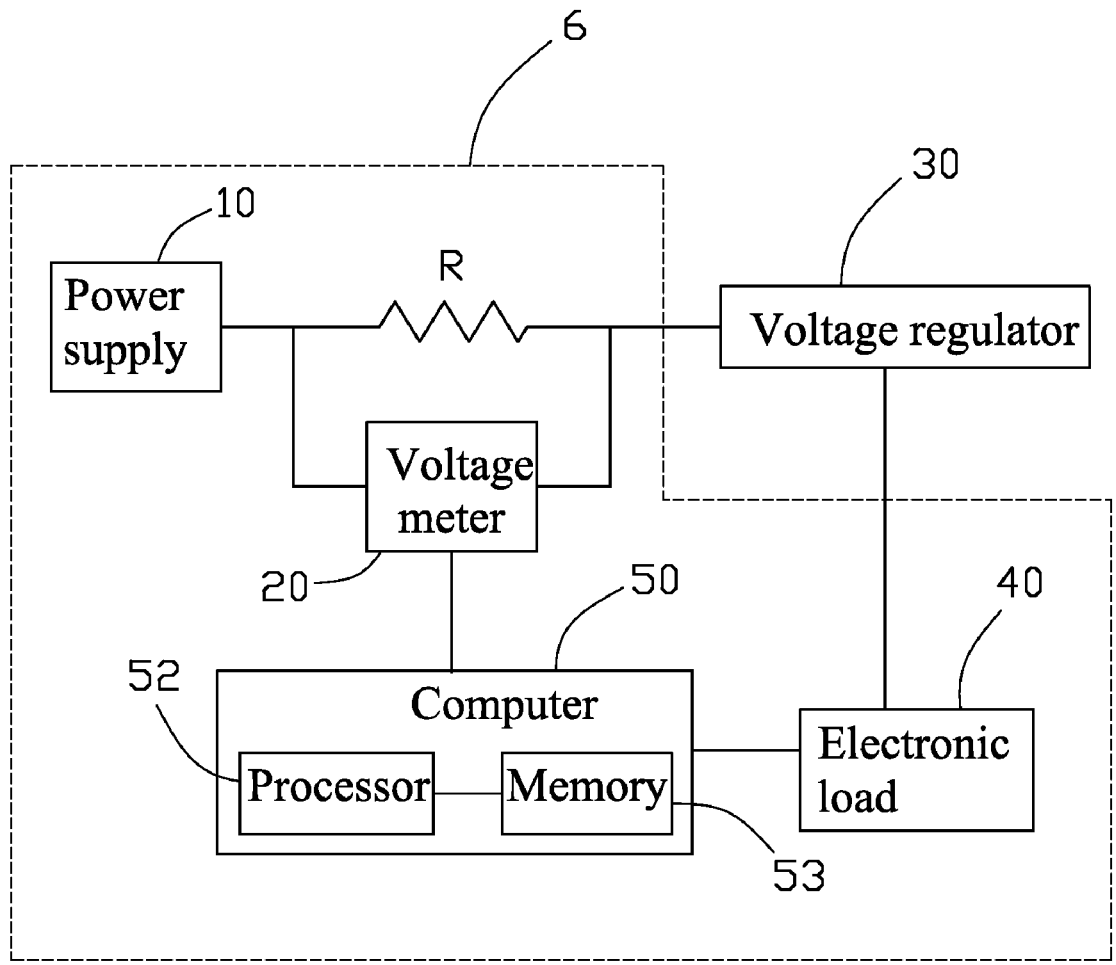
FIG. 1 is a block diagram of an exemplary embodiment of a system for measuring power conversion efficiency of a voltage regulator, the measurement system including a memory.
Figure 2:
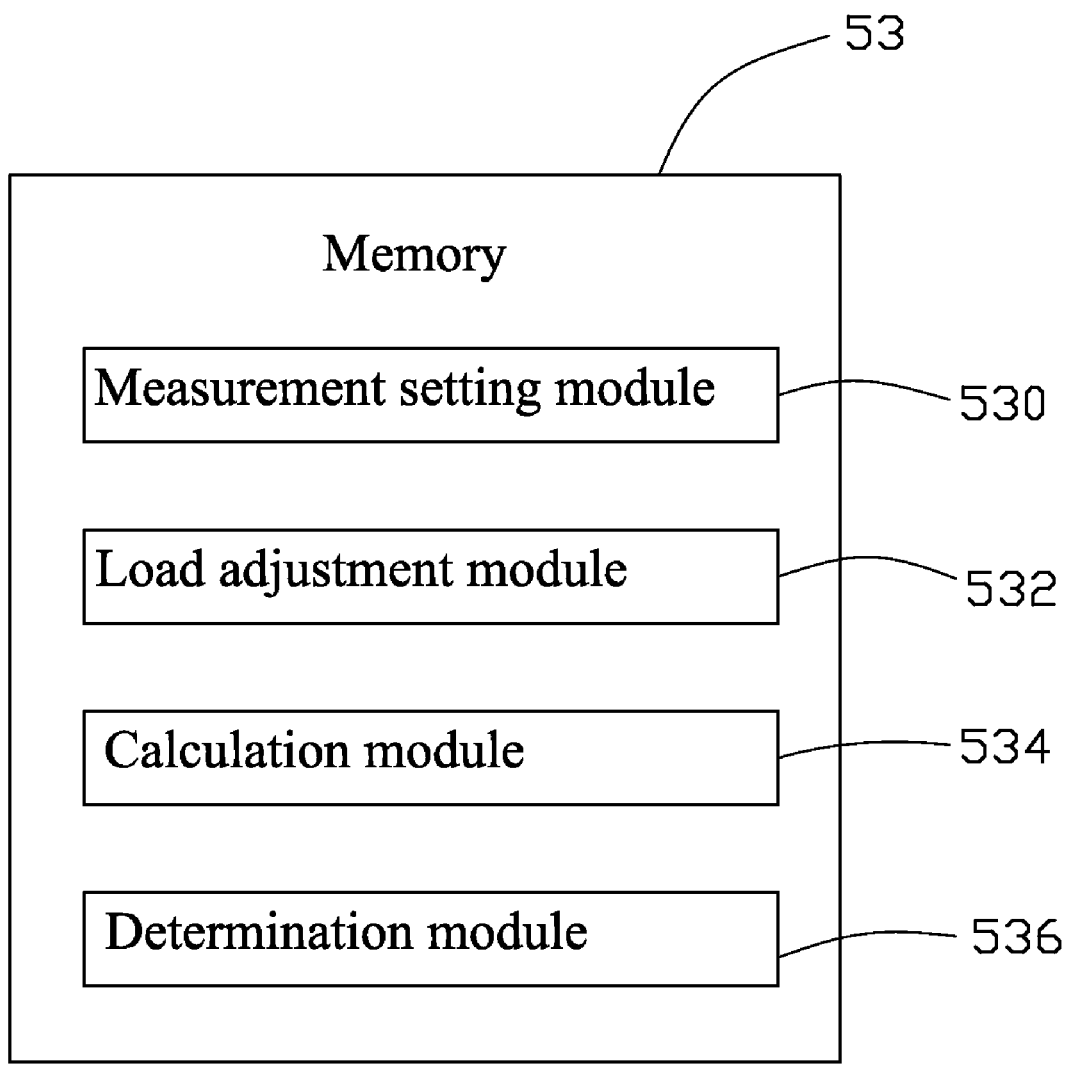
FIG. 2 is a block diagram of the memory of FIG. 1.

Referring to FIGS. 1 and 2, an exemplary embodiment of a system 6 for measuring power conversion efficiency of a voltage conversion device, such as a voltage regulator 30, under each output current is shown. The measurement system 6 includes a power supply 10, a resistor R, a voltage meter 20, an electronic load 40, and a measuring device, such as a computer 50. The power supply 10 is connected to the voltage regulator 30 via the resistor R and the voltage meter 20 in parallel. The voltage regulator 30 is connected to the computer 50 via the electronic load 40. The computer 50 is also connected to the voltage meter 20. In this embodiment, the resistor R is a device with low resistance, the electronic load 40 is a precision device which can record certain parameters, and its loads or impedance can be adjusted. The electronic load 40 can record input voltages of the electronic load 40 and currents passing through the electronic load 40. The power supply 10 outputs a first direct current (DC) voltage divided by the resistor R, to provide a divided DC voltage to the voltage regulator 30. The voltage regulator 30 converts the divided DC voltage into a second DC voltage provided to the electronic load 40. The voltage meter 20 measures voltages between two ends of the resistor R. The computer 50 measures the power conversion efficiencies of the voltage regulator 30. In one embodiment, the computer 50 can be connected to the voltage meter 20 and the electronic load 40 via universal serial bus (USB) interfaces, recommended standard (RS) 232 interfaces, or other kind of interfaces.

The computer 50 includes a processor 52 and a memory 53. The processor 52 is connected to the memory 53. The memory 53 includes a measurement setting module 530, a load adjustment module 532, a calculation module 534, and a determination module 536, each of which stores one or more computerized instructions for the processor 52.

The measurement setting module 530 presets a maximum output current Imax of the voltage regulator 30 and a total measurement number input by users, and sequentially calculates a target output current Ip for each sequence number of measurement p according to a target output current formula Ip=Imax×(5×p−5) % (p=1, . . . , n). For example, if a maximum output current Imax of the voltage regulator 30 is 10 A, the total measurement number is 21, the target output currents Ips are 0 A (amperes), 0.5 A, 1 A, 1.5 A, . . . , and 10 A.

The load adjustment module 532 reads a current passing through the electronic load 40, and adjusts an impedance of the electronic load 40 to equal the current passing through the electronic load 40 with the target output current of the voltage regulator 30 at the sequence number of measurement. For example, if the current passing through the electronic load 40 exceeds the target output current of the voltage regulator 30 at the sequence number of measurement, the load adjustment module 532 increases impedance of the electronic load 40. If the current passing through the electronic load 40 is less than the target output current of the voltage regulator 30 at the sequence number of measurement, the load adjustment module 532 decreases the impedance of the electronic load 40.

The calculation module 534 reads a plurality of groups, such as 30 groups, of currents passing through the electronic load 40 and inputs voltages of the electronic load 40, and calculates each output power of the voltage regulator 30 by multiplying each input voltage and the corresponding current passing through the electronic load 40 for each sequence number of measurement. The calculation module 534 can also read a plurality of groups, of voltages of the voltage meter 20, calculate each input power of the voltage regulator 30 according to a known resistance of the resistor R and an output voltage of the power supply 10, and calculate the power conversion efficiency for each sequence number of measurement equal to an average of a sum of a ratio of each output power to a corresponding input power. For example, if an input voltage of the electronic load 40 is Vou, a current passing through the electronic load 40 is Iou, and the output power Pou of the voltage regulator 30 is Pou=Vou×Iou. If the known output voltage of the power supply 10 is V1, the known resistance of the resistor R is r, the input voltage of the voltage regulator 30 is Vin, the current Iin passing through the resistor R is Iin=(V1−Vin)/r, the input power Pin of the voltage regulator 30 is Pin=Vin×Iin, and the power conversion efficiency Eff of the voltage regulator 30 is Eff=Pou/Pin.

The determination module 536 determines whether a sequence number of measurement equals the total measurement number. If not, the determination module 536 adds one to the sequence number of measurement to obtain a new sequence number of measurement for a subsequent measurement. If the sequence number of measurement equals the total measurement number, the determination module 536 sets a load of the electronic load 40 to zero, displays measurement results, such as power conversion efficiencies of the voltage regulator 30 for each output current, and issues notification that the measurement has been completed.

Figure 3:
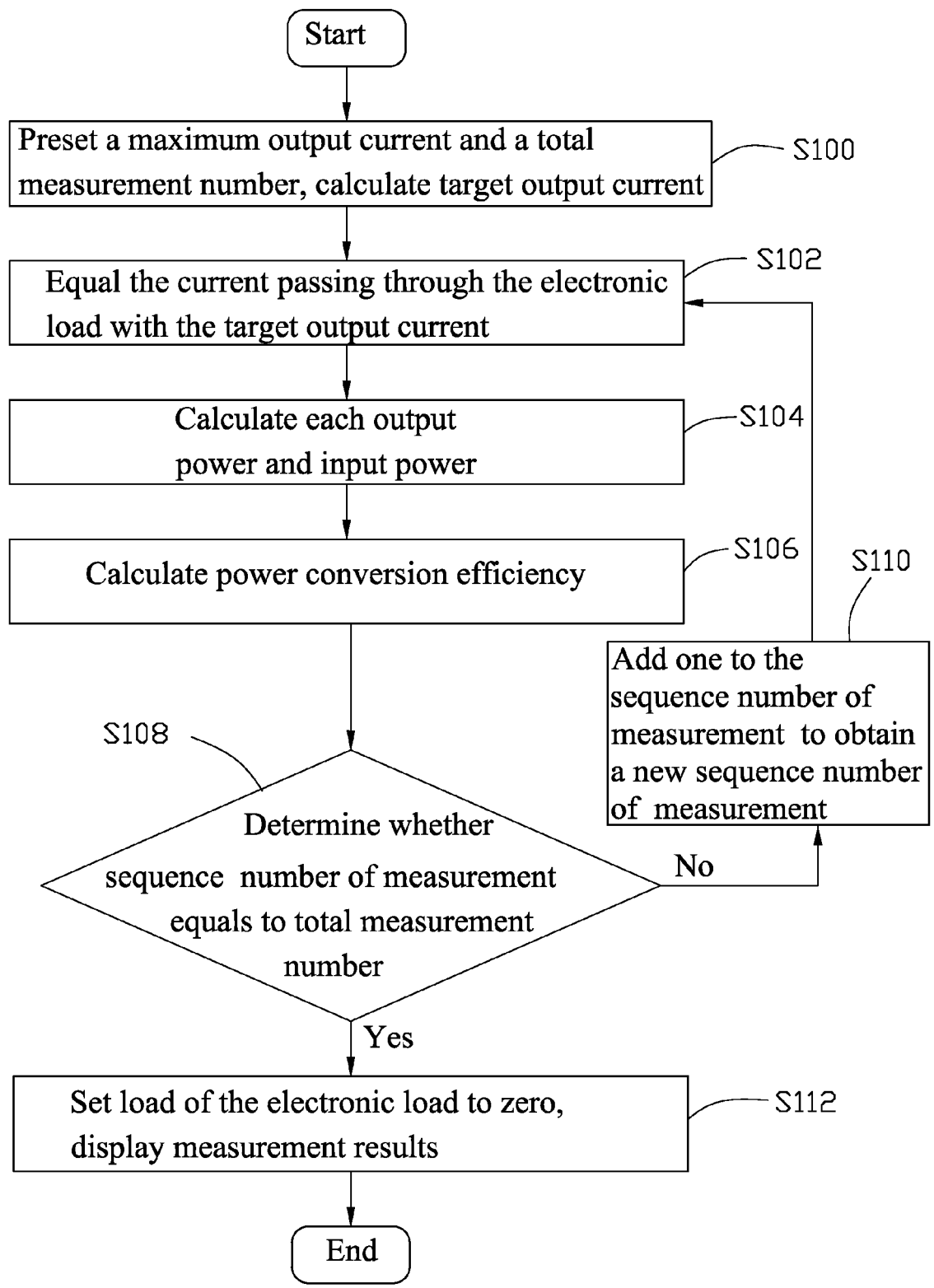
FIG. 3 is a flowchart of an exemplary embodiment of a method for measuring power conversion efficiency of a voltage regulator.

FIG. 3 is a flowchart of an exemplary embodiment of a measurement method for measuring a power conversion efficiency of a voltage regulator, such as, the voltage regulator 30. The measurement method includes the following steps.

In step S100, the measurement setting module 530 presets a maximum output current Imax, for example 10 A, of the voltage regulator 30 and a total measurement number, for example 21, input by users, calculates each target output current Ip for each sequence number of measurement according to the target output current formula Ip=Imax×(5×p−5) % (p=1, . . . , 21), and sets an initial sequence number of measurement to one. In one embodiment, the measurement setting module 530 may set the initial sequence number of measurement to other numbers to start the measurement.

In step S102, the load adjustment module 532 adjusts an impedance of the electronic load 40 to equal the current passing through the electronic load 40 with the target output current of the voltage regulator 40 at the sequence number of measurement.

In step S104, the calculation module 534 reads a plurality of groups, such as 30 groups, of currents Ioui (i=1, . . . , 30) passing through the electronic load 40 and input voltages Voui (i=1, . . . , 30) of the electronic load 40 at the sequence number of measurement, calculates each output power Poui (i=1, . . . , 30) of the voltage regulator 30 by multiplying the input voltage and the corresponding current passing through the electronic load 40, that is Poui=Voui×Ioui (i=1, . . . , 30). The calculation module 534 also reads a plurality of groups, such as 30 groups, of voltages Vi (i=1, . . . , 30) of the voltage meter 20, calculates each input power Pini (i=1, . . . , 30) of the voltage regulator 30 according to a known resistance of the resistor R and an output voltage of the power supply 10, that is Pini=(V1−Vi)×(V1−Vi)/r (i=1, . . . , 30).

In step S106, the calculation module 534 calculates that the power conversion efficiency Effp (p=1, . . . , 21) at the sequence number of measurement equals an average of a sum of a ratio of each output power Poui (i=1, . . . , 30) to each input power Pini (i=1, . . . , 30), that is $$Effp = \frac{\sum_{i=1\sim30} Poui/Pini}{30} \quad (p = 1, \ldots, 21).$$

In step S108, the determination module 536 determines whether the sequence number of measurement equals the total measurement number. If not, S110 is implemented. If the sequence number of measurement equals the total measurement number, S112 is implemented.

In step S110, the determination module 536 adds one to the sequence number of measurement to obtain a new sequence number of measurement, and step S102.

In step S112, the determination module 536 sets the load of the electronic load 40 to zero, displays measurement results, and informs users that the measurement has been completed.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A measurement system for measuring power conversion efficiencies of a voltage regulator, the measurement system comprising:
  a resistor;
  a voltage meter connected with the resistor in parallel, the voltage regulator being connected to a power supply via the resistor and the voltage meter;
  an electronic load connected to the voltage regulator; and
  a measuring device connected between the voltage meter and the electronic load, the measuring device comprising a processor and a memory connected to the processor, the memory comprising a plurality of modules each of which stores one or more computerized instructions being executed by the processor, wherein the plurality of modules comprises:
    a measurement setting module to preset a maximum output current of the voltage regulator and a total measurement number input by users, set an initial sequence number of measurement, and calculate a target output current for each sequence number of measurement according to a target output current formula;
    a load adjustment module to read a current passing through the electronic load for the sequence number of measurement, adjust an impedance of the electronic load to make the current passing through the electronic load equal to a corresponding target output current of the voltage regulator for the sequence number of measurement;
    a calculation module to read a plurality of groups of currents passing through the electronic load and input voltages of the electronic load for the sequence number of measurement, calculate a plurality of output powers of the voltage regulator, each output power of the voltage regulator calculated by multiplying one of the input voltages with a corresponding current passing through the electronic load, read a plurality of groups of voltages of the voltage meter, calculate a plurality of input powers of the voltage regulator, each input power of the voltage regulator calculated according to an input power of the voltage regulator formula, and calculate that the power conversion efficiency at the sequence number of measurement equals an average of a sum of a ratio of each output power to each input power; and
    a determination module to determine whether the sequence number of measurement exceeds a measurement number, and set a new sequence number of measurement for a subsequent measurement when the sequence number of measurement does not exceed the measurement number.

2. The system of claim 1, wherein the target output current formula is Ip=Imax×(5×p−5) %, where Imax is a maximum output current of the voltage regulator, p is the sequence number of measurement, and Ip is the target output current.

3. The system of claim 1, wherein the load adjustment module increases the impedance of the electronic load when the current passing through the electronic load exceeds the corresponding target output current of the voltage regulator for the sequence number of measurement, and the load adjustment module decreases the impedance of the electronic load when the current passing through the electronic load does not exceed the corresponding target output current of the voltage regulator at the sequence number of measurement.

4. The system of claim 1, wherein the input power of the voltage regulator formula is Pini=(V1−Vi)×(V1−Vi)/r, where V1 is an output voltage of the power supply, r is the resistance of the resistor, Vi is an input voltage of the voltage regulator, and Pini is the input power of the voltage regulator.

5. The system of claim 1, wherein the determination module determines whether the sequence number of measurement equals the total measurement number, and, if not, adds one to the sequence number of measurement to obtain a new sequence number of measurement.

6. The system of claim 1, wherein if the sequence number of measurement exceeds the measurement number, the determination module zeroes the load of the electronic load and displays measurement results.

7. A method for measuring power conversion efficiencies of a voltage regulator, the method comprising:

presetting a maximum output current of the voltage regulator and a total measurement number, setting an initial sequence number of measurement, and calculating a target output current for each sequence number of measurement according to a target output current formula;

adjusting an impedance of an electronic load to equal a current passing through the electronic load with the corresponding target output current of the voltage regulator at the sequence number of measurement;

reading a plurality of groups of currents passing through the electronic load and input voltages of the electronic load at the sequence number of measurement, calculating a plurality of output powers of the voltage regulator, each output power of the voltage regulator calculated by multiplying one of the input voltage with a corresponding current passing through the electronic load, reading a plurality of groups of voltages of a voltage meter, and calculating a plurality of input powers of the voltage regulator, each input power of the voltage regulator calculate according to an input power of the voltage regulator formula;

calculating a power conversion efficiency at the sequence number of measurement, wherein the power conversion efficiency equals an average of a sum of a ratio of each output power to a corresponding input power; and determining whether the sequence number of measurement exceeds a measurement number, and, if not, setting a new sequence number of measurement.

8. The method of claim 7, wherein the target output current formula is $Ip=Imax \times (5 \times p-5)$ %, where Imax is a maximum output current of the voltage regulator, p is the sequence number of measurement, and Ip is the target output current.

9. The method of claim 7, further comprising:
increasing the impedance of the electronic load when the current passing through the electronic load exceeds the corresponding target output current of the voltage regulator at the sequence number of measurement, and decreasing the impedance of the electronic load when the current passing through the electronic load does not exceed the corresponding target output current of the voltage regulator at the sequence number of measurement.

10. The method of claim 7, wherein the input power of the voltage regulator formula is $Pini=(V1-Vi) \times (V1-Vi)/r$, where V1 is an output voltage of the power supply, r is the resistance of the resistor, Vi is an input voltage of the voltage regulator, and Pini is the input power of the voltage regulator.

11. The method of claim 7, further comprising:
determining whether the sequence number of measurement equals the total measurement number, and, if not, adding one to the sequence number of measurement to obtain a new sequence number of measurement.

12. The method of claim 7, further comprising:
zeroing the load of the electronic load, and displaying measurement results when the sequence number of measurement exceeds the measurement number.

\* \* \* \* \*